(No Model.)

J. C. HENDERSON.
MARINE ELECTRIC MESSENGER.

No. 293,735. Patented Feb. 19, 1884.

WITNESSES:

INVENTOR:
J. C. Henderson
BY
ATTORNEYS.

(No Model.) 3 Sheets—Sheet 2.

J. C. HENDERSON.
MARINE ELECTRIC MESSENGER.

No. 293,735. Patented Feb. 19, 1884.

WITNESSES:

INVENTOR:

BY

ATTORNEYS.

(No Model.) 3 Sheets—Sheet 3.
J. C. HENDERSON.
MARINE ELECTRIC MESSENGER.
No. 293,735. Patented Feb. 19, 1884.
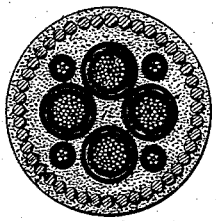
*Fig. 3.*
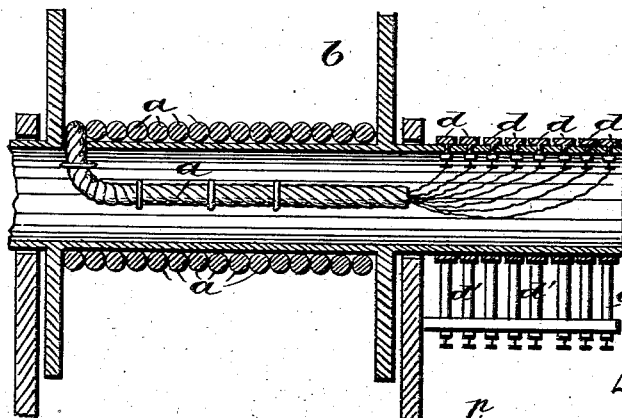
*Fig. 4.*
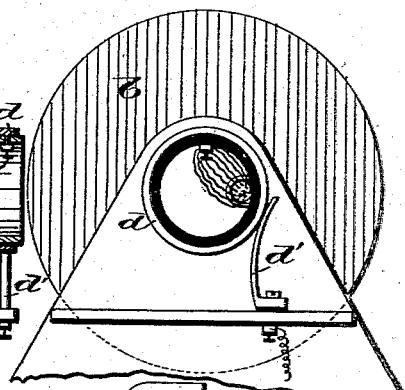
*Fig. 5.*
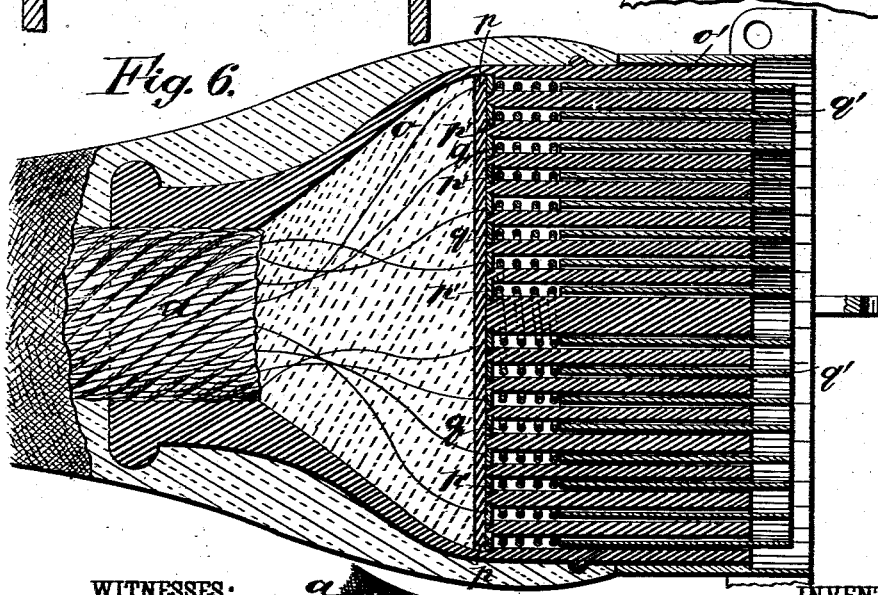
*Fig. 6.*
*Fig. 7.*
WITNESSES:
H. Wurzer
C. Sedgwick
INVENTOR:
J. C. Henderson
BY Munn & Co
ATTORNEYS.

UNITED STATES PATENT OFFICE.

JOHN C. HENDERSON, OF NEW YORK, N. Y.

MARINE ELECTRIC MESSENGER.

SPECIFICATION forming part of Letters Patent No. 293,735, dated February 19, 1884.

Application filed May 21, 1883. (No model.)

*To all whom it may concern:*

Be it known that I, JOHN C. HENDERSON, of the city, county, and State of New York, have invented a new and useful Improvement in Marine Electric Messengers, of which the following is a full, clear, and exact description.

The object of my invention is, first, to prevent collisions between vessels at sea; second, to take off or put on board of vessels at sea lines, passengers, stores, &c.; third, to provide means for towing sailing-vessels or disabled steamships; and, fourth, to provide, in case of a wreck, for sending lines, &c., on shore or from the shore to the vessel, in place of using a rocket apparatus.

To these ends I make use of a pilot vessel or messenger provided for its propulsion with an electric motor, and connected by a cable with a steamship or other vessel, that is provided with one or more dynamo-electric machines for operating the electric motor on the pilot-vessel, their conductors passing through the cable or cables. The pilot-vessel is also provided with electric steering apparatus operated and controlled from the ship, and also with an electric light and with a signaling horn or whistle, all as hereinafter set forth and claimed.

Reference is to be had to the accompanying drawings, forming a part of this specification, in which similar letters of reference indicate corresponding parts in all the figures.

Figure 1:
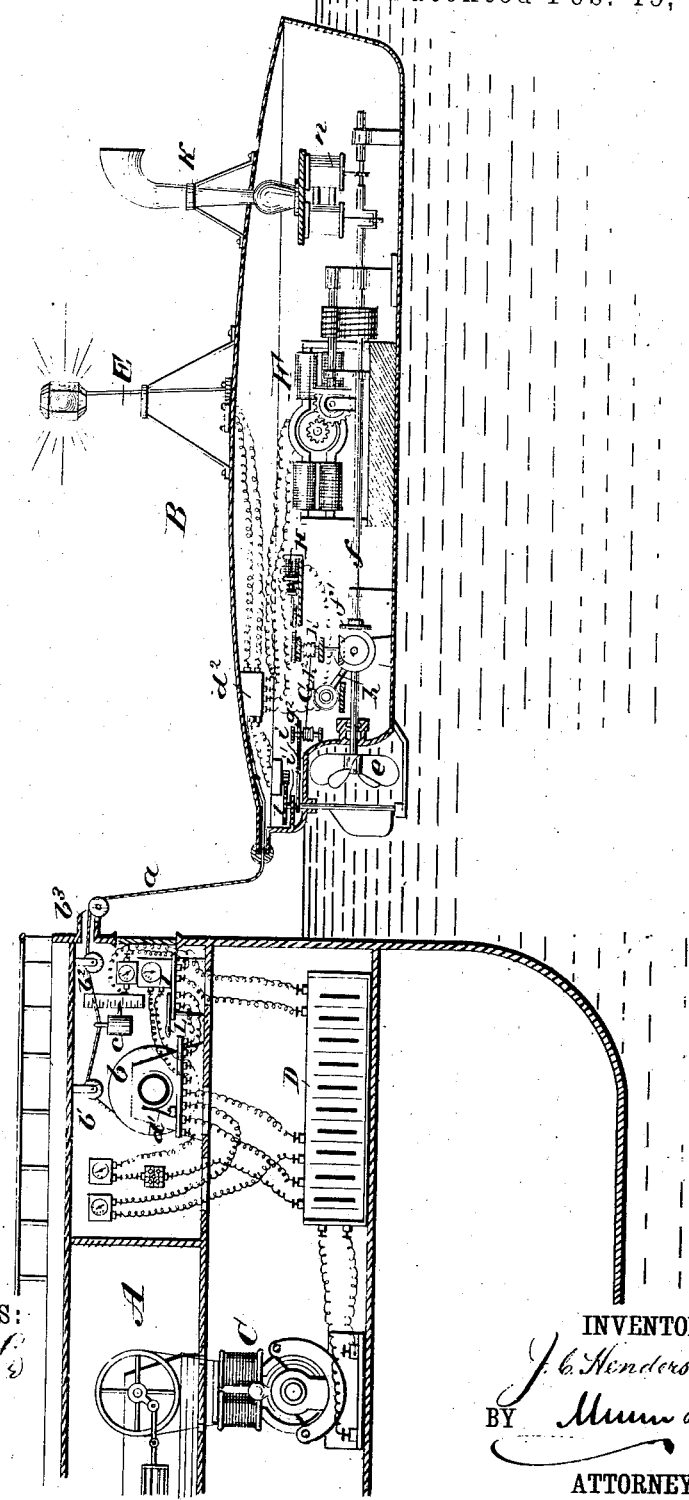
Figure 2:
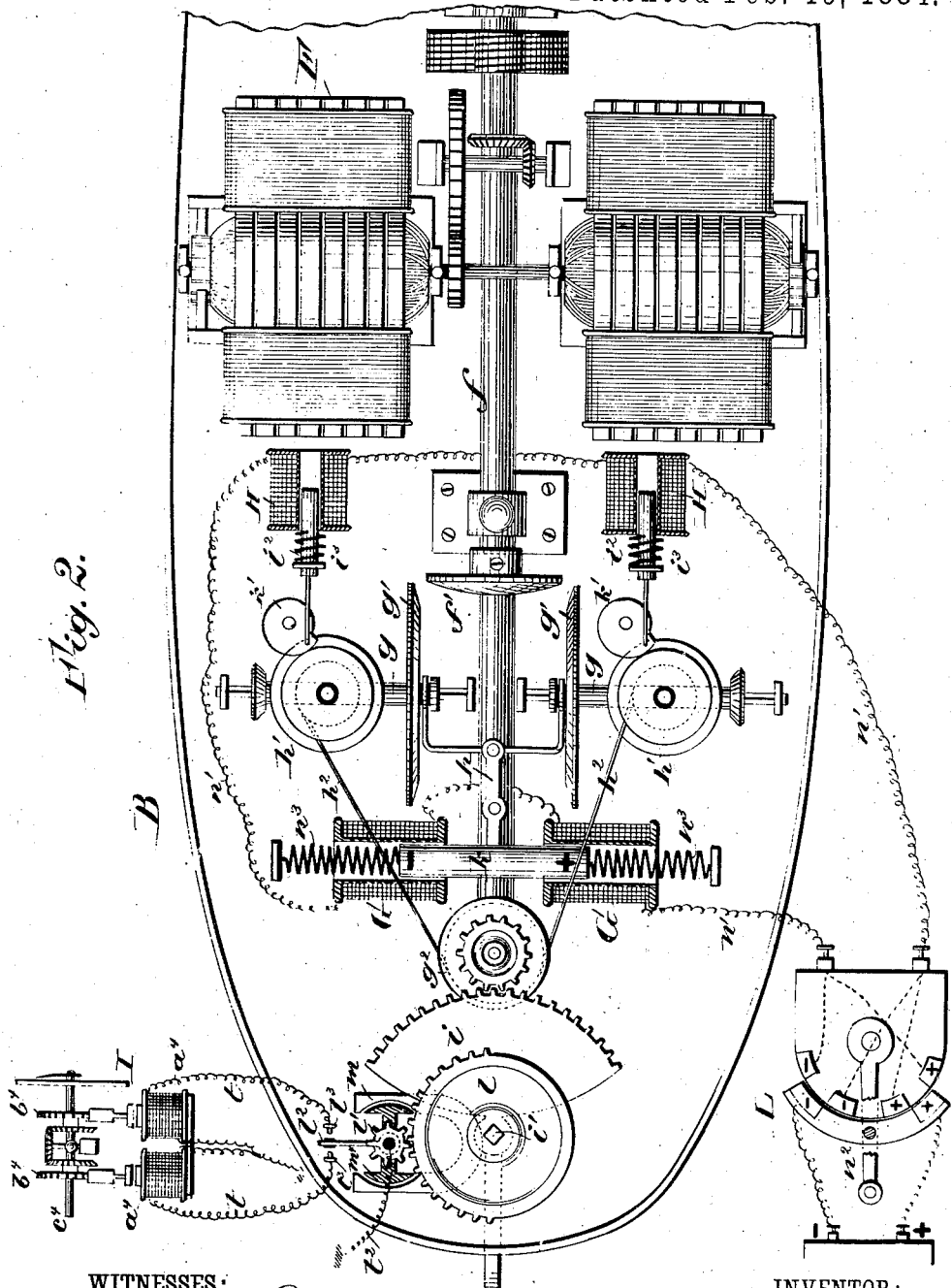

Figure 1 is a sectional elevation of the pilot vessel or messenger, and of the steamship or vessel from which it is operated. Fig. 2 is a plan view, in larger size, of a portion of the pilot-vessel, showing the propelling and steering mechanism. Fig. 3 is a cross-section of the cable. Fig. 4 is a detail section of the winding-drum, showing the connections of the electric conductors. Fig. 5 is an end view of the same. Fig. 6 is a detail section, in large size, of the cable and the coupling of the electric conductors. Fig. 7 is a perspective view of the coupling.

A in Fig. 1 represents a steamship or sailing-vessel, and B is the pilot vessel or messenger, which is of comparatively small size, and is decked over, so that the mechanism is entirely inclosed.

On the vessel A is a dynamo-electric machine, C, connected to a storage-battery, D, from which the wires pass to the cable $a$. The cable passes from a winding-drum, $b$, over suitable guide-rollers, $b'$ $b^2$, and through a port, $b^3$, at the stern of the vessel.

On the cable $a$, between the two rollers $b'$ $b^2$, is a weight, $c$, in connection with which there is a gage for indicating the strain or tension of the cable.

As shown in Figs. 4 and 5, the windlass $b$ has a hollow shaft, into which the end of the cable $a$ enters, and the end of the shaft is provided with a series of rings, $d$, to which the several conductors or wires of the cable are connected, and upon the frame of the windlass are a series of brushes, $d'$, which bear upon the rings $d$. The wires from the battery D are connected with the brushes $d'$, so that the electrical connections of the several conductors are maintained, while the cable is allowed to unwind from the windlass. The cable, as shown in Fig. 3, is provided with four large conductors, two of which are for the circuit to the electromotor on the vessel B, and the other two for the electric-light apparatus. It also has four smaller conductors or single wires, for operating and controlling the steering mechanism.

Upon the vessel B the conductors of the cable are connected to a distributing-box, $d^2$, from which the several wires pass to the electric lamp E, the electromotor F, and to the magnets G, by which the rudder is operated, as hereinafter specified. The vessel B is provided with a propeller, $e$, upon the shaft $f$. The electromotor may be of any suitable construction, and, as shown in Fig. 2 most clearly, is geared to the propeller-shaft $f$.

Upon the shaft $f$ is a friction-wheel, $f'$, and upon separate shafts $g$ $g$, that are placed at opposite sides and at right angles to the shaft $f$, are friction-wheels $g'$ $g'$. These two wheels are connected to their respective shafts $g$ by means of a pin and slot, so that they may slide thereon, and to their hubs are connected the forked ends of a lever, $h$, by which either one of the wheels $g'$ may be brought in contact with the wheel $f'$.

Above the shaft $g$, and geared thereto, are winding-drums $h'$, from which ropes $h^2$ pass to a drum, $g^2$, and on the shaft of the drum $g^2$ is a pinion that gears with a cogged segment, $i$, attached on the steering-post $i'$.

The two magnets G G are of the axial type, and have a common polarized armature, K, which is connected to the lever $h$, so that by the movement of the armature in one direction or the other as the magnets are energized one of the wheels $g'$ is brought in contact with the wheel $f'$ and its shaft $g$, and the drum $h'$ being thus rotated, the rudder is turned either to the right or to the left.

H H are axial magnets connected in the circuit with the magnets G, and have their armatures $i^2$ connected to cams $k'$, that are placed contiguous to the drums $h'$, so as to bear thereon when the armatures $i^2$ are moved outward, and thus hold the drums by friction, to prevent any movement of the rudder. The armatures are provided with spiral springs $i^3$, that act to move them outward and apply the cams with sufficient force; but when the circuit is closed to the magnet, the armatures are drawn inward and the cams released.

The electric lamp E is fitted at the top of a hollow post or staff on the vessel B, and it preferably consists of a group of incandescent lamps, which are connected by wires to the distributing-box $d^2$. The signaling-horn K is operated by an air-pump, $n$, which is connected to the propeller-shaft $f$, so as to insure a continual blast or signal while the propeller is in motion. The circuit-wires $n'$, which pass to the magnets G H, are connected to a transmitter placed on the vessel A, as shown in larger size at L in Fig. 2. This transmitter is provided with a reversing switch arm, $n^2$, arranged for being moved to transmit a current of either polarity, and for breaking the circuit, so that the armature $k$ of the two magnets G G may be caused to move in either direction for operation of the rudder, or left free to assume the middle position by means of the springs $n^3$, that are connected to its ends. Upon the vessel A there is also a circuit-closer for controlling the circuit of the electric motor F. Each magnet $a^4$ of the indicating apparatus I is connected by wires $t$, that pass through the cable, to one of the points $t'$ on the vessel B, and the circuit to each magnet is completed by wires that pass from the magnets down into the water, and by a wire, $t^2$, that passes from the inductive apparatus on the vessel B to the water, so that only two wires are needed in the cable $a$ in connection with the indicator. The coupling device of the cable is shown in Figs. 6 and 7. The end of the cable is fitted with a socket-piece, $o$, that contains a series of concentric rings, $o'$, of insulating material, projecting from a fixed base-plate, $p$, and the plate $p$ is provided with metallic plates $p'$, to which the wires or conductors of the cable $a$ are connected.

Around and between the rings $o'$ are spiral springs $q$, resting upon the plates $p'$, and between the rings $o'$ there are fitted tubes $q'$, that rest upon the springs $q$, these tubes $q'$ being loose, so that they may slide in and out. The circuit is through the tubes $q'$, springs $q$, and plates $p$.

In using the pilot or messenger, after it is put in the water with the cable properly connected, the circuit is to be closed for operating the electromotor F, so as to propel the pilot, and at the same time the steering mechanism is controlled by using the switch L, and in this manner the vessel may be sent and guided in any direction from a vessel to the shore, or from the shore to a vessel, or between two vessels for the purpose of carrying lines, stores, or passengers. At night the circuit to the electric lamp will be closed, so that the position of the vessel can readily be seen, and the horn being at the same time sounded, attention will be drawn to the pilot from those with whom it is desired to communicate.

This pilot or messenger can be operated in a seaway, or when it would not be safe or practicable to use ordinary boats, or in locations where there are no rocket-stations for communication from the shore to a stranded vessel.

Having thus fully described my invention, I claim as new and desire to secure by Letters Patent—

1. The combination, with the drums $h'$ $h'$, of the cams $k'$, bearing against said drums, the armature $i^2$, operating said cams, the spiral springs $i^3$, and the axial magnets H in circuit with the magnets G, as and for the purpose specified.

2. The combination of the shaft $f$, friction-wheels $f'$ $g'$, shafts $g$ $g$, drums $h'$, ropes $h^2$, magnets G G, the armature $k$, and the lever $h$, substantially as described, for effecting the operation by electricity of the rudder of the pilot-vessel.

3. The combination of the electric cable $a$, windlass $b$, having a hollow shaft, rings $d$, and brushes $d'$, substantially as described, for allowing the winding and unwinding of the cable upon or from the windlass without breaking the electrical connection.

JOHN C. HENDERSON.

Witnesses:
EDGAR TATE,
EDWARD M. CLARK.